US012708930B2

(12) United States Patent
Shimonaga et al.

(10) Patent No.: US 12,708,930 B2
(45) Date of Patent: Aug. 18, 2026

(54) CLEANING DEVICE, READING DEVICE, AND IMAGE FORMING APPARATUS

(71) Applicant: FUJIFILM Business Innovation Corp., Tokyo (JP)

(72) Inventors: Akio Shimonaga, Kanagawa (JP); Masakazu Shirai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/181,499

(22) Filed: Mar. 9, 2023

(65) Prior Publication Data

US 2024/0091818 A1 Mar. 21, 2024

(30) Foreign Application Priority Data

Sep. 16, 2022 (JP) ................................ 2022-147966

(51) Int. Cl.

*B08B 1/50* (2024.01)
*B08B 1/12* (2024.01)
*B08B 1/20* (2024.01)

(52) U.S. Cl.

CPC .................. *B08B 1/50* (2024.01); *B08B 1/12* (2024.01); *B08B 1/20* (2024.01)

(58) Field of Classification Search

CPC . H04N 1/00; H04N 1/028; H04N 1/04; G03B 27/52; B08B 1/20; B08B 1/12

See application file for complete search history.

(56) References Cited

U.S. PATENT DOCUMENTS

2020/0401355 A1* 12/2020 Yamashita ............ G06F 3/1208

FOREIGN PATENT DOCUMENTS

| | | |
|---|---|---|
| JP | H04253081 | 9/1992 |
| JP | 2001310528 | 11/2001 |
| JP | 2004236252 | 8/2004 |
| JP | 2010004415 | 1/2010 |
| JP | 2010004415 A * | 1/2010 |
| JP | 2011166393 A * | 8/2011 |

OTHER PUBLICATIONS

"Notice of Reasons for Refusal of Japan Counterpart Application", issued on May 26, 2026, with English translation thereof, p. 1-p. 11.

* cited by examiner

*Primary Examiner* — Shay Karls
(74) *Attorney, Agent, or Firm* — JCIPRNET

(57) ABSTRACT

A cleaning device includes: a cleaning unit that cleans a cleaning section by coming into contact with the cleaning section, the cleaning section being disposed in a transport space through which a medium is transported; a support unit that supports the cleaning unit, the support unit rotating about a rotation center to cause the cleaning unit to pass the cleaning section in a direction along a transporting direction in which the medium is transported; and a removing unit that is disposed upstream of the cleaning section in the transporting direction of the medium and that comes into contact with the cleaning unit to remove a substance adhering to the cleaning unit.

13 Claims, 6 Drawing Sheets

CLEANING DEVICE, READING DEVICE, AND IMAGE FORMING APPARATUS

CROSS-REFERENCE TO RELATED APPLICATIONS

This application is based on and claims priority under 35 USC 119 from Japanese Patent Application No. 2022-147966 filed Sep. 16, 2022.

BACKGROUND

(i) Technical Field

The present disclosure relates to a cleaning device, a reading device, and an image forming apparatus.

(ii) Related Art

Japanese Unexamined Patent Application Publication No. 2010-004415 (see [0021]-[0022] and FIGS. 2-4), hereinafter referred to as Patent Document 1, describes an image reading device that reads an image on a surface of a medium in an image forming apparatus.

According to the technology described in Patent Document 1, an upper surface of a first platen glass (G1) is cleaned by a brush portion (32) that rotates, and the brush portion (32) comes into contact with a plate-shaped member (6), which is disposed in a downstream region in a rotation direction of the brush portion (32), from a position below the plate-shaped member (6) in the direction of gravity to remove foreign matter adhering to the brush portion (32).

SUMMARY

Aspects of non-limiting embodiments of the present disclosure relate to a structure in which an amount of substances that enter a transport space is less than that in a case where a removing unit, with which a cleaning unit is brought into contact to remove substances adhering to the cleaning unit, is disposed downstream of an object to be cleaned in a transporting direction in which a medium is transported.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cleaning device including: a cleaning unit that cleans a cleaning section by coming into contact with the cleaning section, the cleaning section being disposed in a transport space through which a medium is transported; a support unit that supports the cleaning unit, the support unit rotating about a rotation center to cause the cleaning unit to pass the cleaning section in a direction along a transporting direction in which the medium is transported; and a removing unit that is disposed upstream of the cleaning section in the transporting direction of the medium and that comes into contact with the cleaning unit to remove a substance adhering to the cleaning unit.

BRIEF DESCRIPTION OF THE DRAWINGS

An exemplary embodiment of the present disclosure will be described in detail based on the following figures, wherein:

FIGS. 4A and 4B illustrate positions of a rotating drum according to the exemplary embodiment, wherein FIG. 4A illustrates a cleaning position and FIG. 4B illustrates a first calibration position;

FIGS. 5A and 5B also illustrate positions of the rotating drum according to the exemplary embodiment, wherein FIG. 5A illustrates a first sheet-transport position and FIG. 5B illustrates a second calibration position; and FIGS. 6A and 6B also illustrate positions of the rotating drum according to the exemplary embodiment, wherein FIG. 6A illustrates a second sheet-transport position and FIG. 6B illustrates a removal position.

DETAILED DESCRIPTION

Figure 1:
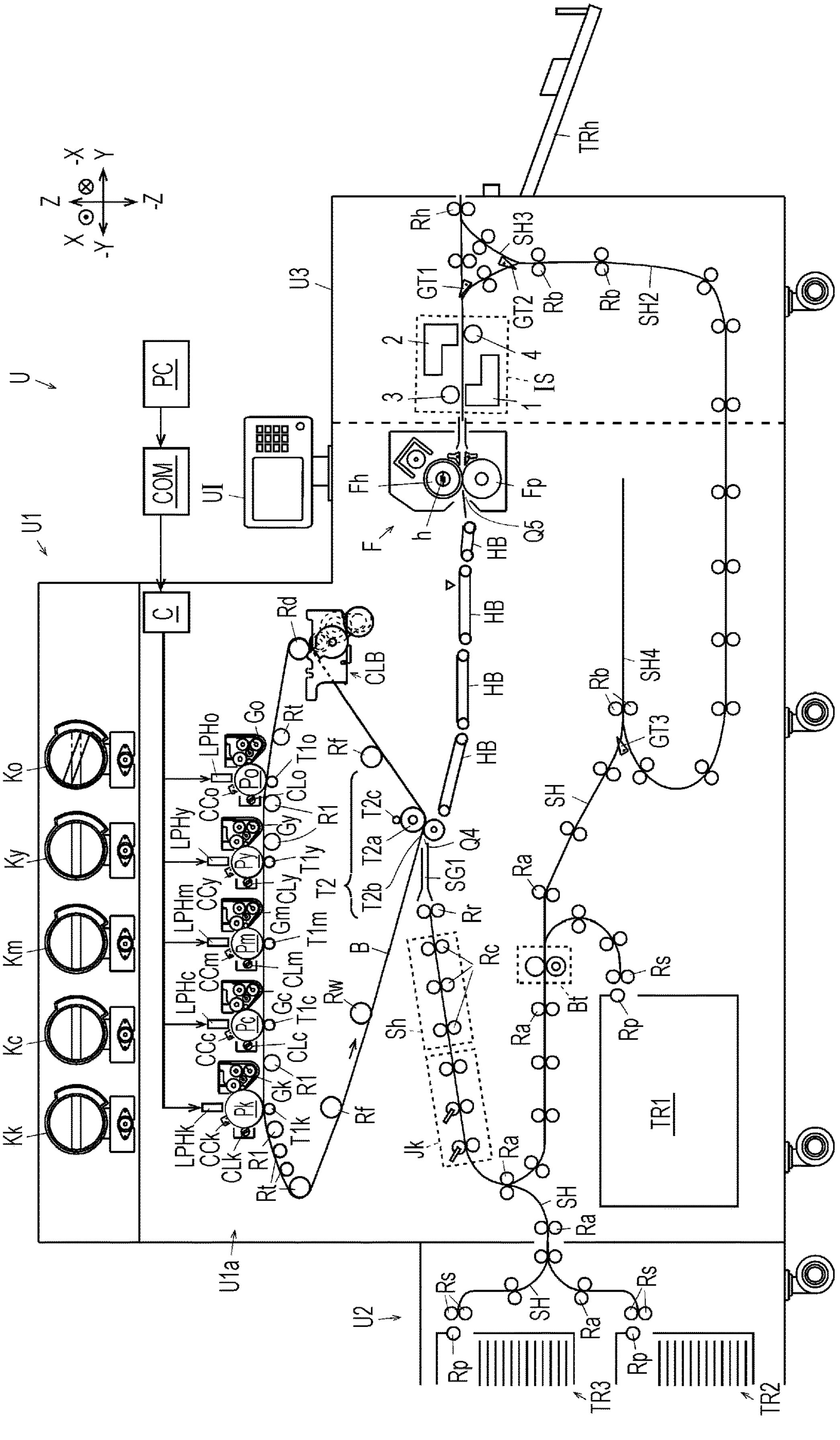
FIG. 1 illustrates the overall structure of an image forming apparatus according to an exemplary embodiment.

While an exemplary embodiment of the present disclosure will be described with reference to the drawings, the present disclosure is not limited to the exemplary embodiment described below.

To facilitate understanding of the following description, in each figure, the front-back direction (medium width direction), the left-right direction (medium transporting direction), and the up-down direction are defined as the X-axis direction, the Y-axis direction, and the Z-axis direction, respectively. In addition, the directions shown by arrows X, −X, Y, −Y, Z, and −Z are defined as forward, backward, rightward, leftward, upward, and downward, respectively, and sides in those directions are defined as the front side, the back side, the right side, the left side, the top side, and the bottom side, respectively.

In addition, in each figure, a circle with a dot in the middle represents an arrow coming out of the page, and a circle with an X in the middle represents an arrow going into the page.

In the drawings, components other than those to be described with reference to the drawings are omitted as appropriate to facilitate understanding.

EXEMPLARY EMBODIMENT

Description of Overall Structure of Printer U of Exemplary Embodiment

FIG. 1 illustrates the overall structure of an image forming apparatus according to an exemplary embodiment.

Referring to FIG. 1, a printer U, which is an example of an image forming apparatus according to the exemplary embodiment of the present disclosure, includes a printer body U1; a feeder unit U2, which is an example of a supply device that supplies a medium to the printer body U1; an operation unit UI operated by a user; and a finisher U3, which is an example of a post-processing device that performs post-processing on the medium output from the printer body U1.

Description of Marking Structure of Exemplary Embodiment

Referring to FIG. 1, the printer body U1 includes a controller (example of a control unit) C that controls the printer U; a communication unit (not illustrated) that receives image information transmitted from a print image server COM, which is an example of an information transmission device connected to a unit outside the printer U by a dedicated cable (not illustrated); and a marking unit U1*a*, which is an example of a recording unit that records an image on the medium. The print image server COM is connected by a cable or a network, such as a local area network (LAN), to a personal computer PC, which is an example of an image transmission device that transmits information of an image to be printed by the printer U.

The marking unit U1*a* includes photoconductors Py, Pm, Pc, and Pk, which are examples of image carriers for respective colors, which are yellow (Y), magenta (M), cyan (C), and black (K), and a photoconductor Po used to make an image glossy when, for example, a photographic image is printed. The photoconductors Py to Po are each made of a dielectric having a photosensitive surface.

Referring to FIG. 1, a charging device CCk, an exposure device LPHk, a developing device Gk, a first transfer roller Tlk, and a photoconductor cleaner CLk, which are examples of a charging unit, a latent-image forming unit, a developing unit, a first transfer unit, and an image-carrier cleaning unit, respectively, are arranged around the black photoconductor Pk in that order in a rotation direction in which the photoconductor Pk rotates.

Similarly, charging devices CCy, CCm, CCc, and CCo, exposure devices LPHy, LPHm, LPHc, and LPHo, developing devices Gy, Gm, Gc, and Go, first transfer rollers T1*y*, T1*m*, T1*c*, and T1*o*, and photoconductor cleaners CLy, CLm, CLc, and CLo are disposed around the other photoconductors Py, Pm, Pc, and Po.

Toner cartridges Ky, Km, Kc, Kk, and Ko, which are examples of containers for developers, are removably supported above the marking unit U1*a*. Developers to be supplied to the developing devices Gy to Go are contained in the toner cartridges Ky to Ko.

An intermediate transfer belt B, which is an example of an intermediate transfer unit and which is also an example of an image carrier, is disposed below the photoconductors Py to Po. The intermediate transfer belt B is disposed between each of the photoconductors Py to Po and a corresponding one of the first transfer rollers T1*y* to T1*o*. The inner surface of the intermediate transfer belt B is supported by a driving roller Rd, which is an example of a driving unit; a tension roller Rt, which is an example of a tension-applying unit; a walking roller Rw, which is an example of a meandering prevention unit; plural idler rollers Rf, which are examples of driven units; a backup roller T2*a*, which is an example a second-transfer facing unit; plural retractable rollers R1, which are examples of movable units; and the first transfer rollers T1*y* to T1*o*.

A belt cleaner CLB, which is an example of an intermediate-transfer-unit cleaning unit, is disposed on the outer surface of the intermediate transfer belt B at a position close to the driving roller Rd.

A second transfer roller T2*b*, which is an example of a second transfer member, faces the backup roller T2*a* with the intermediate transfer belt B disposed therebetween. A contact roller T2*c*, which is an example of a contact unit, is in contact with the backup roller T2*a* to apply a voltage of the same polarity as the charging polarity of the developers to the backup roller T2*a*.

The backup roller T2*a*, the second transfer roller T2*b*, and the contact roller T2*c* constitute a second transfer device T2, which is an example of a second transfer unit according to the exemplary embodiment. The first transfer rollers T1*y* to T1*o*, the intermediate transfer belt B, the second transfer device T2, and other components constitute a transfer apparatus T1, B, T2, which is an example of a transfer unit according to the exemplary embodiment.

A paper feed tray TR1, which is an example of a container, is provided below the second transfer device T2. Recording sheets S, which are examples of media, are stored in the paper feed tray TR1. A pick-up roller Rp, which is an example of a pick-up unit, and separation rollers Rs, which are examples of separation units, are disposed in an upper right region of the paper feed tray TR1. A transport path SH, along which the recording sheets S are transported, extends from the separation rollers Rs. Plural transport rollers Ra, which are examples of transport units that transport the recording sheets S downstream, are arranged along the transport path SH.

A deburring device Bt, which is an example of an unnecessary-portion-removing unit, is disposed downstream of the separation rollers Rs. The deburring device Bt performs deburring, which is a process of removing unnecessary portions at the edges of each recording sheet S by transporting the recording sheet S downstream while nipping the recording sheet S at a preset pressure.

A double-feeding detection device Jk is disposed downstream of the deburring device Bt. The double-feeding detection device Jk measures the thickness of the recording sheets S that pass therethrough to detect double feeding, which is a state in which multiple recording sheets S are transported in an overlapping state.

Correction rollers Rc, which are examples of position correction units, are disposed downstream of the double-feeding detection device Jk. The correction rollers Rc correct a skew, that is, an inclination of each recording sheet S with respect to the transporting direction.

Registration rollers Rr, which are examples of adjustment units that adjust the time at which each recording sheet S is transported to the second transfer device T2, are disposed downstream of the correction rollers Rc. A sheet guide SG1, which is an example of a medium guide unit, is disposed downstream of the registration rollers Rr.

The feeder unit U2 also includes paper feed trays TR2 and TR3 and other components that are structured similarly to the paper feed tray TR1, the pick-up roller Rp, the separation rollers Rs, and the transport rollers Ra, and a transport path SH that extends from the paper feed trays TR2 and TR3 joins the transport path SH in the printer body U1 at a position upstream of the double-feeding detection device Jk.

Plural transport belts HB, which are examples of medium transport units, are disposed downstream of the second transfer roller T2*b* in the transporting direction of the recording sheet S.

A fixing device F, which is an example of a fixing unit, is disposed downstream of the transport belts HB in the transporting direction of the recording sheet S.

A test device IS, which is an example of a reading device, is disposed in the finisher U3, which is located downstream of the fixing device F.

A transport path SH that extends toward an output tray TRh, which is an example of a stacking unit, is provided downstream of the test device IS. Output rollers Rh, which are examples of output units, are disposed at the downstream end of the transport path SH.

A reversing path SH2, which is an example of a transport path that branches from the transport path SH, is provided downstream of the test device IS. A first gate GT1, which is an example of a transporting-direction-switching unit, is disposed at the branching point at which the reversing path SH2 branches from the transport path SH.

The reversing path SH2 has plural switchback rollers Rb, which are examples of transport units that are rotatable in forward and reverse directions. A connection path SH3 is provided upstream of the switchback rollers Rb as an example of a transport path that branches from an upstream portion of the reversing path SH2 and joins the transport path SH at a position downstream of the branching point at which the reversing path SH2 branches from the transport path SH. A second gate GT2, which is an example of a transporting-direction-switching unit, is disposed at the branching point at which the connection path SH3 branches from the reversing path SH2.

A switchback path SH4, which is disposed downstream of the reversing path SH2 and below the fixing device F, is used to reverse the transporting direction of the recording sheet S, that is, to transport the recording sheet S in a switchback manner. The switchback path SH4 has switchback rollers Rb, which are examples of transport units that are rotatable in forward and reverse directions. In addition, a third gate GT3, which is an example of a transporting-direction-switching unit, is disposed is at the entrance of the switchback path SH4.

A transport path SH disposed downstream of the switchback path SH4 joins the transport path SH that extends from the paper feed tray TR1.

Marking Operation

The printer U starts a job, which is an image forming operation, when the printer U receives image information transmitted from the personal computer PC through the print image server COM. When the job is started, the photoconductors Py to Po, the intermediate transfer belt B, and other components rotate.

The photoconductors Py to Po are driven by a drive source (not illustrated).

The charging devices CCy to CCo receive a preset voltage and charge the surfaces of the respective photoconductors Py to Po.

The exposure devices LPHy to LPHo, which are examples of latent-image forming units and which are also examples of light-emitting devices, respectively output laser beams Ly, Lm, Lc, Lk, and Lo for writing latent images in accordance with control signals from the controller C, thereby writing electrostatic latent images on the charged surfaces of the photoconductors Py to Po.

The developing devices Gy to Go develop the electrostatic latent images on the surfaces of the respective photoconductors Py to Po.

The toner cartridges Ky to Ko supply the developers to the respective developing devices Gy to Go, which consume the developers in the developing process.

The first transfer rollers T1*y* to T1*o* receive a first transfer voltage having a polarity opposite to the charging polarity of the developers, so that the visible images on the surfaces of the photoconductors Py to Po are transferred onto the intermediate transfer belt B.

The photoconductor cleaners CLy to CLo clean the surfaces of the respective photoconductors Py to Po by removing the developers that remain on the surfaces of the photoconductors Py to Po after the first transfer process.

The intermediate transfer belt B causes O, Y, M, C, and K images to be transferred thereto in that order when the intermediate transfer belt B passes through first transfer regions in which the intermediate transfer belt B faces the photoconductors Py to Po, and then passes through a second transfer region Q4 in which the intermediate transfer belt B faces the second transfer device T2. When a monochrome image is to be formed, an image of a single color is transferred onto the intermediate transfer belt B and transported toward the second transfer region Q4.

The recording sheets S are fed from one of the paper feed trays TR1 to TR3 by the corresponding pick-up roller Rp in accordance with, for example, the size of the received image information, designation of the recording sheets S, and the sizes and types of the recording sheets S that are stored.

The separation rollers Rs separate the recording sheets S fed by the pick-up roller Rp from each other.

The deburring device Bt applies a preset pressure to each recording sheet S that passes therethrough to deburr the recording sheet S.

The double-feeding detection device Jk detects the thickness of the recording sheets S that pass therethrough to detect double feeding of the recording sheets S.

The correction rollers Rc correct a skew of each recording sheet S that passes therethrough by bringing the recording sheet S into contact with a wall surface (not illustrated).

The registration rollers Rr feed the recording sheet S at a time corresponding to the time at which the images on the surface of the intermediate transfer belt B reach the second transfer region Q4.

The sheet guide SG1 guides the recording sheet S fed by the registration rollers Rr to the second transfer region Q4.

The backup roller T2*a* of the second transfer device T2 receives a preset second transfer voltage having the same polarity as the charging polarity of the developers through the contact roller T2*c*, so that the images on the intermediate transfer belt B are transferred onto the recording sheet S.

The belt cleaner CLB cleans the intermediate transfer belt B by removing the developers that remain on the surface of the intermediate transfer belt B after the images are transferred in the second transfer region Q4.

The transport belts HB hold the recording sheet S to which the images have been transferred by the second transfer device T2 on the surfaces thereof, and transport the recording sheet S downstream.

The fixing device F includes a heating roller Fh, which is an example of a heating member, and a pressing roller Fp, which is an example of a pressing member. A heater h, which is an example of a heat source, is disposed in the heating roller Fh. The fixing device F heats the recording sheet S that passes through a fixing region Q5, in which the heating roller Fh and the pressing roller Fp are in contact with each other, while pressing the recording sheet S, thereby fixing the unfixed images on the surface of the recording sheet S to the recording sheet S. The heating roller Fh and the pressing roller Fp constitute a fixing member Fp, Fh according to the exemplary embodiment.

The test device IS reads an image on the recording sheet S that has passed through the fixing device F and detects an image defect.

When the recording sheet S that has passed through the test device IS is to be subjected to double-sided printing, the first gate GT1 is activated so that the recording sheet S is transported to the reversing path SH2, transported in a switchback manner along the switchback path SH4, and fed to the registration rollers Rr again along the transport path SH, and printing is performed on a second surface of the recording sheet S.

When the recording sheet S is to be output onto the output tray TRh face-up, that is, such that the surface on which an image is recorded faces upward, the recording sheet S is transported along the transport path SH and output onto the output tray TRh by the output rollers Rh.

When the recording sheet S is to be output face-down, that is, such that the surface on which the image is recorded faces downward, the recording sheet S is temporarily transported from the transport path SH to the reversing path SH2. After the trailing end of the recording sheet S in the transporting direction has passed the second gate GT2, forward rotation of the switchback rollers Rb is stopped. Then, the second gate GT2 is switched and the switchback rollers Rb are rotated in the reverse direction so that the recording sheet S is transported to the output tray TRh along the connection path SH3.

The output recording sheet S is placed on the output tray TRh.

Description of Image Reading Device

Figure 2:
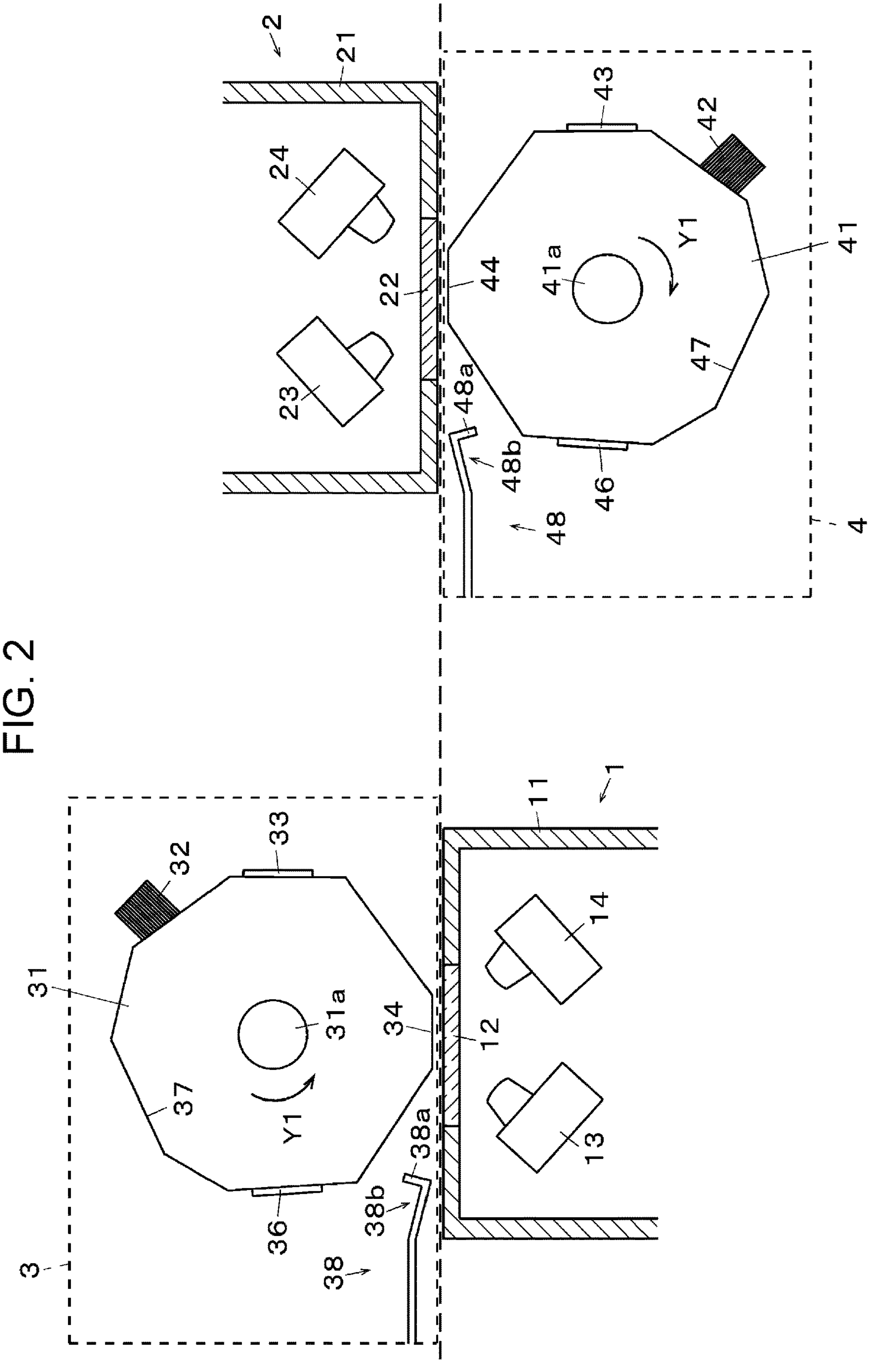
FIG. 2 illustrates a test device according to the exemplary embodiment.

FIG. 2 illustrates the test device according to the exemplary embodiment.

Referring to FIG. 2, the test device IS according to the exemplary embodiment includes an upstream sensor unit 1, which is an example of a first reading unit, and a downstream sensor unit 2, which is an example of a second reading unit.

The upstream sensor unit 1 according to the exemplary embodiment includes a first housing 11 having a window-shaped first reading surface 12, which is an example of a reading portion, at the top end of the housing 11, and the first reading surface 12 faces the transport path SH, which is a transport space through which the recording sheet S is transported. A first light 13, which is an example of an illumination unit, and a first image sensor 14, which is an example of a reading element, are disposed on the inner side of the first reading surface 12. The upstream sensor unit 1 according to the exemplary embodiment is capable of reading a lower surface of the recording sheet S with the first image sensor 14 when the recording sheet S is transported along the transport path SH.

In the exemplary embodiment, the upstream sensor unit 1 and the downstream sensor unit 2 are arranged to be inverted relative to each other with the transport path SH at the center, but have similar structures. Accordingly, the downstream sensor unit 2 is capable of reading an upper surface of the recording sheet S when the recording sheet S is transported along the transport path SH.

Figure 3:
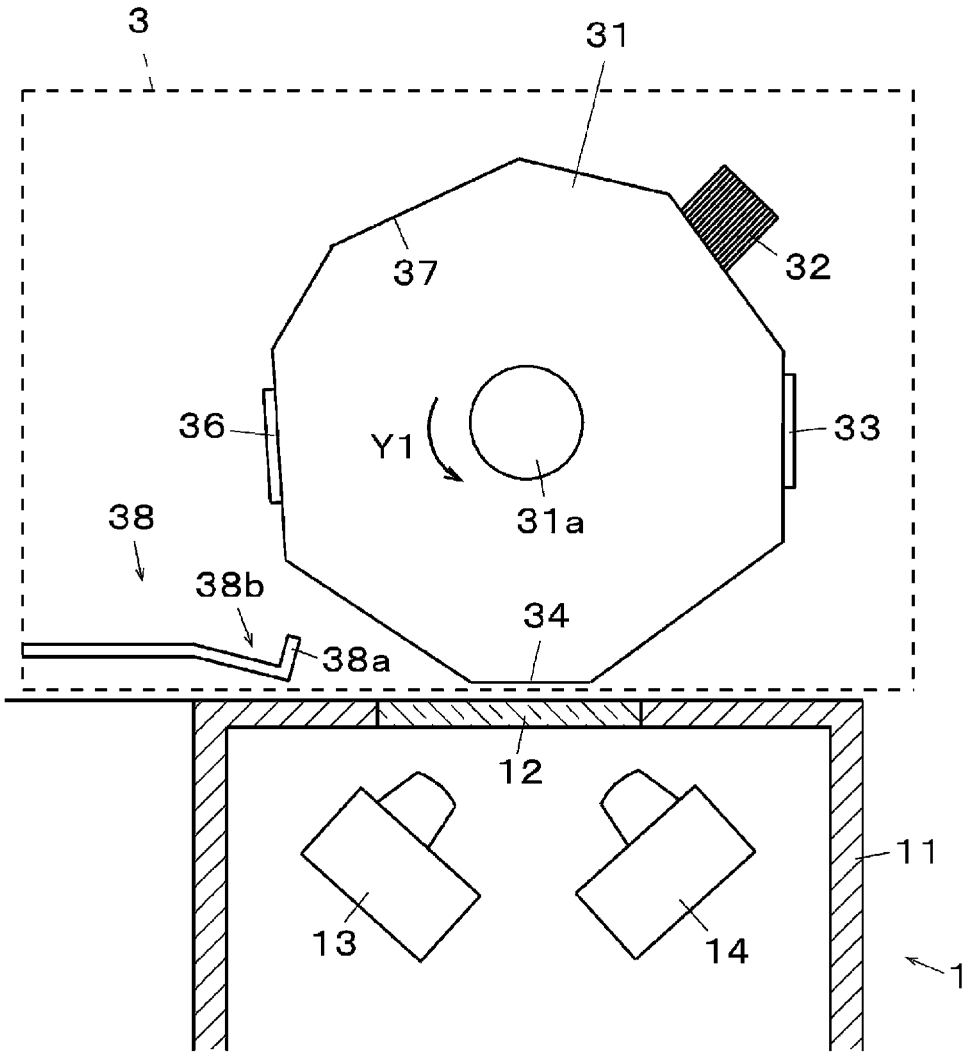
FIG. 3 is an enlarged view of a calibration unit according to the exemplary embodiment.

FIG. 3 is an enlarged view of a calibration unit according to the exemplary embodiment.

Referring to FIGS. 2 and 3, an upstream calibration unit 3, which is an example of a first calibration unit, is disposed to face the upstream sensor unit 1 with the transport path SH disposed therebetween. The upstream calibration unit 3 includes a first rotating drum 31, which is an example of a first support unit. The first rotating drum 31 is supported such that the first rotating drum 31 is rotatable about a rotating shaft 31*a*. The first rotating drum 31 according to the exemplary embodiment rotates in a rotation direction Y1, which is a direction such that the bottom end of the first rotating drum 31 moves in a transporting direction in which the recording sheet S is transported along the transport path SH.

The first rotating drum 31 has an outer peripheral surface that supports a cleaning brush 32, which is an example of a cleaning unit; a first calibration plate 33, which is an example of a first calibrating unit; a first guide 34, which is an example of a first guide unit; a second calibration plate 36, which is an example of a second calibrating unit; and a second guide 37, which is an example of a second guide unit. In the exemplary embodiment, the members 32 to 37 are arranged along the outer periphery of the first rotating drum 31 such that the cleaning brush 32, the first calibration plate 33, the first guide 34, the second calibration plate 36, and the second guide 37 successively pass the first reading surface 12 in that order when the first rotating drum 31 rotates in the rotation direction Y1.

Thus, in the exemplary embodiment, the cleaning brush 32 is disposed only on a portion of the first rotating drum 31 in the rotation direction, and is not provided over the entire circumference of the first rotating drum 31.

A removing rib 38, which is an example of a removing unit, is disposed on the left side of the first rotating drum 31, that is, upstream of the first reading surface 12 in the transporting direction of the recording sheet S. The removing rib 38 is supported by a frame of the upstream calibration unit 3, and is shaped such that an end portion 38*a* thereof is bent downward and then upward. Thus, a reservoir portion 38*b* having a recessed shape, which is an example of a reservoir unit, is provided on an upper surface of the end portion 38*a*.

The position of a distal end of the end portion 38*a* according to the exemplary embodiment is set so that the end portion 38*a* is capable of coming into contact with an end portion of the cleaning brush 32 and does not come into contact with the calibration plates 33 and 36 or the guides 34 and 37 when the first rotating drum 31 rotates. In the exemplary embodiment, when the first rotating drum 31 rotates in the rotation direction Y1, the cleaning brush 32 passes through the position of the removing rib 38 downward in the direction of gravity.

The first rotating drum 31, the cleaning brush 32, and the removing rib 38 constitute a cleaning device for the first reading surface 12 according to the exemplary embodiment.

Figure 4B:
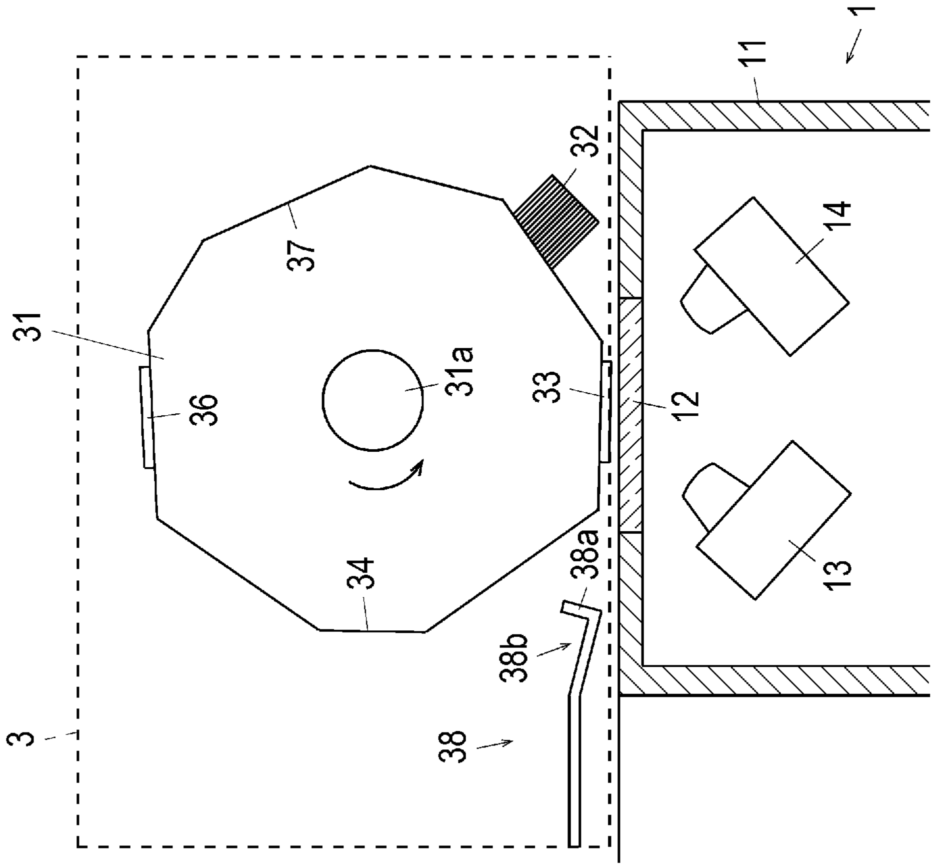
Figure 4A:
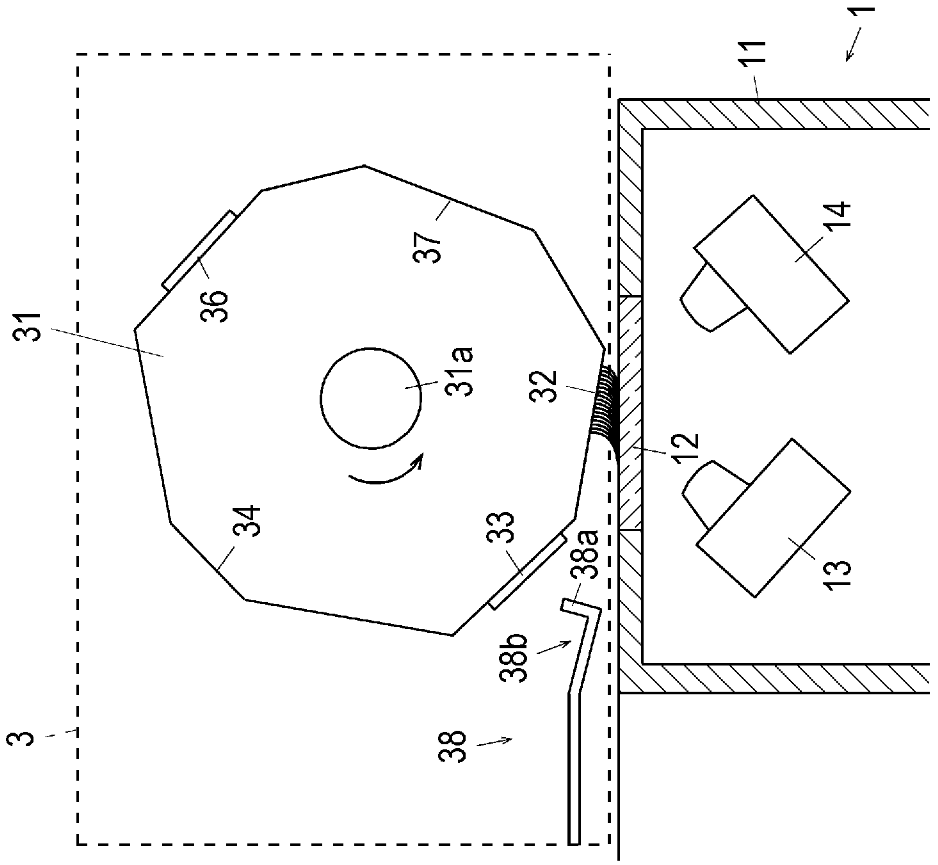

FIGS. 4A and 4B illustrate positions of the rotating drum according to the exemplary embodiment, wherein FIG. 4A illustrates a cleaning position and FIG. 4B illustrates a first calibration position.

Referring to FIG. 4A, when the first rotating drum 31 rotates and when the cleaning brush 32 passes through the position of the first reading surface 12, which is an example of a cleaning section, the cleaning brush 32 comes into contact with the first reading surface 12 and cleans the first reading surface 12. The first reading surface 12 is cleaned, for example, when power of the printer U is turned on or after a predetermined number of recording sheets S have passed through the position of the first reading surface 12. The cleaning of the first reading surface 12 and calibration of the first image sensor 14, which will be described below, may be performed at the same time or different times.

Referring to FIG. 4B, the first calibration plate 33 is a plate-shaped member having a surface in a color that serves as a reference color in a reading process performed by the first image sensor 14, and is composed of a plate in yellow, which is an example of a reference color, in the exemplary embodiment. When the first calibration plate 33 is used to calibrate the first image sensor 14, the first rotating drum 31 is stopped at the first calibration position illustrated in FIG. 4B, and the first image sensor 14 is calibrated while the first calibration plate 33 faces the first reading surface 12.

Figure 5A:
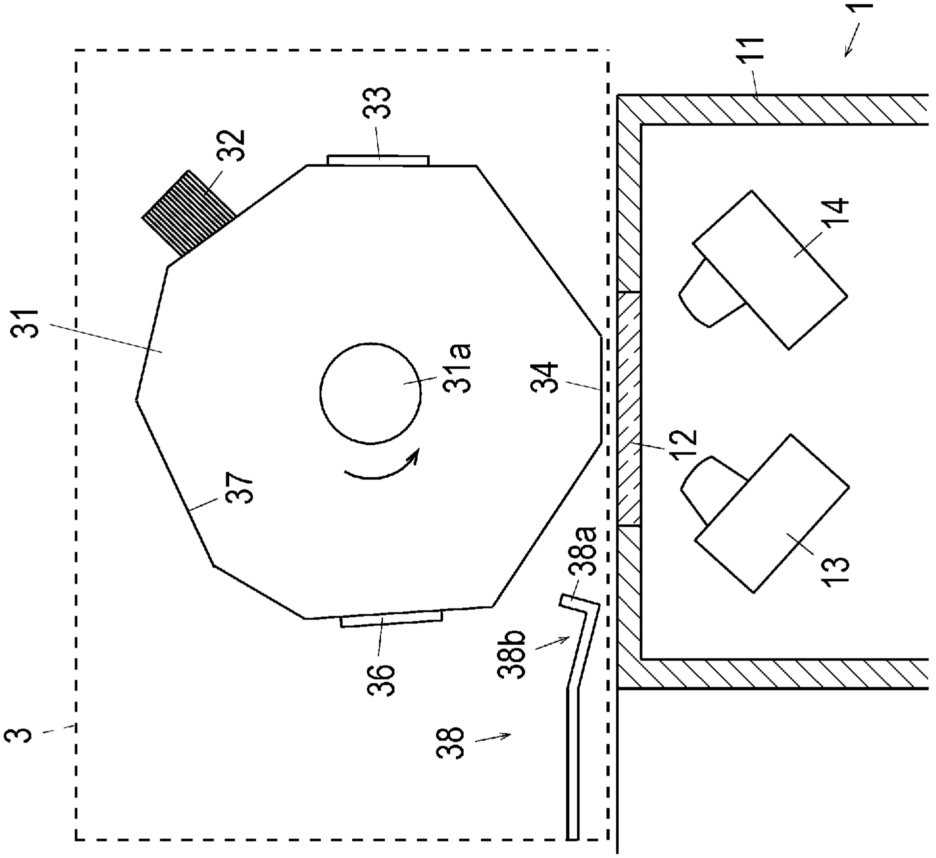
Figure 5B:
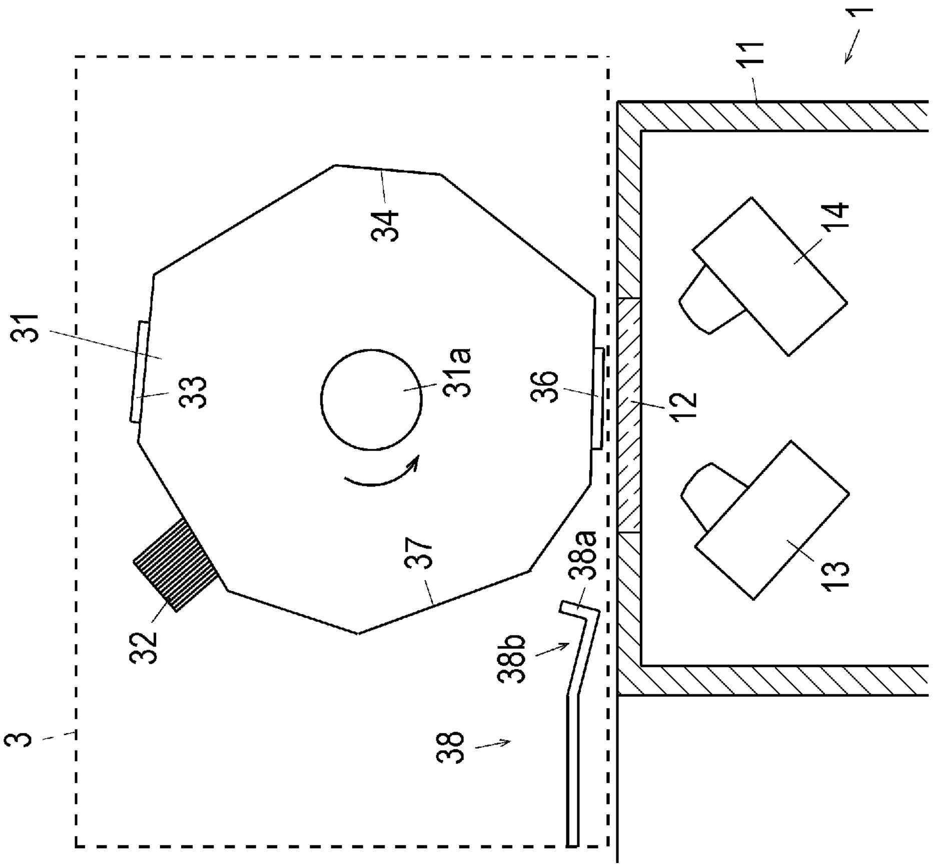

FIGS. 5A and 5B also illustrate positions of the rotating drum according to the exemplary embodiment, wherein FIG. 5A illustrates a first sheet-transport position and FIG. 5B illustrates a second calibration position.

Referring to FIG. 5A, when an image on the recording sheet S that passes through the transport path SH is read and when the thickness of the recording sheet S is less than a predetermined thickness, the first rotating drum 31 is stopped at the first sheet-transport position illustrated in FIG. 5A at which the first guide 34 faces the first reading surface 12. In the exemplary embodiment, when the recording sheet S that is used is a plain paper sheet or a thin sheet, the image is read while the first rotating drum 31 is stopped and retained at the first sheet-transport position.

Referring to FIG. 5B, the second calibration plate 36 is a plate-shaped member having a surface in a color that serves as a reference color in the reading process performed by the first image sensor 14, and is composed of a plate in white, which is an example of a reference color that differs from the color of the first calibration plate 33, in the exemplary embodiment. When the second calibration plate 36 is used to calibrate the first image sensor 14, the first rotating drum 31 is stopped at the second calibration position illustrated in FIG. 5B, and the first image sensor 14 is calibrated while the second calibration plate 36 faces the first reading surface 12.

Figure 6B:
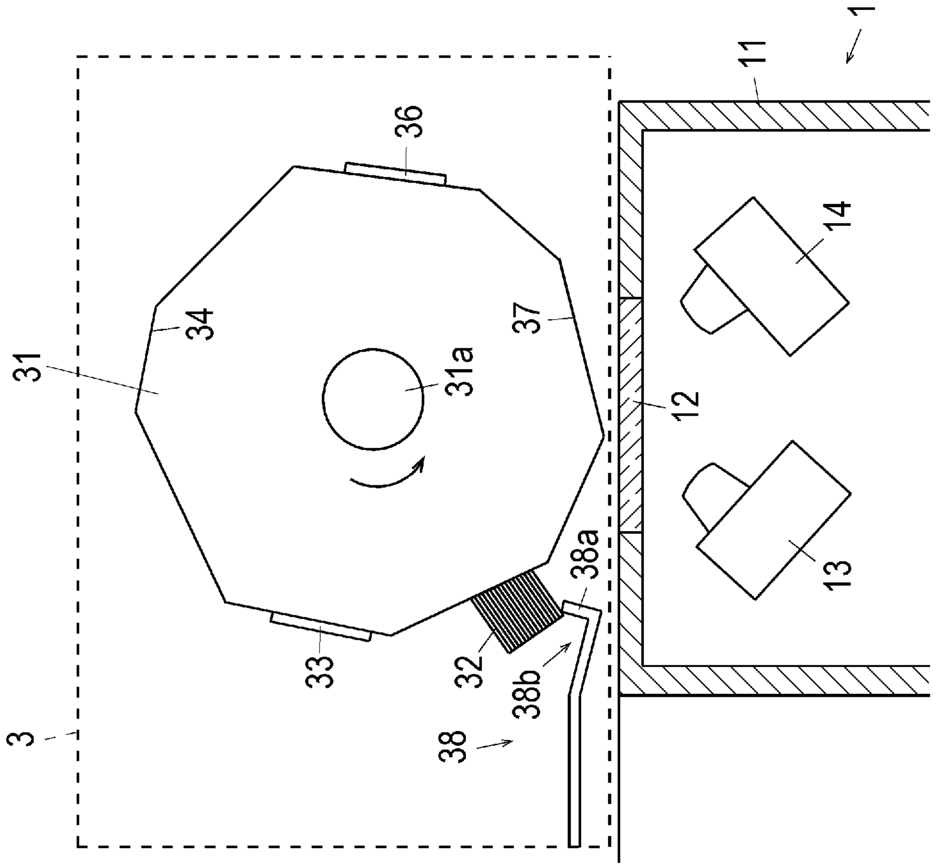
Figure 6A:
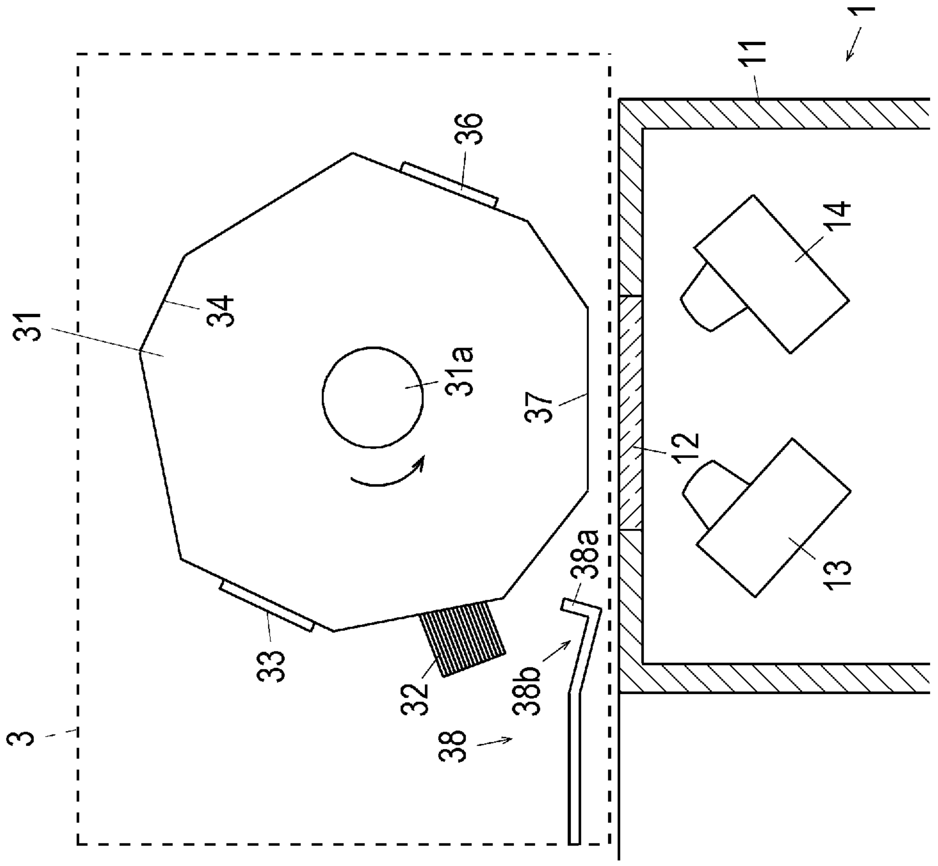

FIGS. 6A and 6B also illustrate positions of the rotating drum according to the exemplary embodiment, wherein FIG. 6A illustrates a second sheet-transport position and FIG. 6B illustrates a removal position.

Referring to FIG. 6A, when an image on the recording sheet S that passes through the transport path SH is read and when the thickness of the recording sheet S is greater than a predetermined thickness, the first rotating drum 31 is stopped at the second sheet-transport position illustrated in FIG. 6A at which the second guide 37 faces the first reading surface 12. As illustrated in FIGS. 5A and 6A, an interval (gap) provided between the second guide 37 and the first reading surface 12 when the second guide 37 and the first reading surface 12 face each other is greater than an interval (gap) provided between the first guide 34 and the first reading surface 12 when the first guide 34 and the first reading surface 12 face each other. In the exemplary embodiment, when the recording sheet S that is used is a thick sheet, the image is read while the first rotating drum 31 is stopped and retained at the second sheet-transport position.

Referring to FIG. 6B, when the first rotating drum 31 rotates from the second sheet-transport position illustrated in FIG. 6A to the cleaning position illustrated in FIG. 4A, the first rotating drum 31 passes through the removal position illustrated in FIG. 6B. When the first rotating drum 31 is at the removal position, the cleaning brush 32 comes into contact with the removing rib 38, and substances, such as paper dust and developer, adhering to the cleaning brush 32 are removed by the removing rib 38. The removed substances are stored in the reservoir portion 38*b*.

A downstream calibration unit 4, which is an example of a second calibration unit, is disposed to face the downstream sensor unit 2 with the transport path SH disposed therebetween. In the exemplary embodiment, the upstream calibration unit 3 and the downstream calibration unit 4 are arranged to be inverted relative to each other with the transport path SH at the center, but have similar structures. The downstream calibration unit 4 operates similarly to the upstream calibration unit 3. Therefore, detailed description of the downstream calibration unit 4 will be omitted.

Operation of Exemplary Embodiment

The test device IS according to the exemplary embodiment having the above-described structure performs a test by reading an image with the image sensor 14 while the first rotating drum 31 is stopped at the first sheet-transport position or the second sheet-transport position depending on the thickness of the recording sheet S. When the image sensor 14 is to be calibrated, the image sensor 14 is calibrated while the first rotating drum 31 is stopped at the first calibration position or the second calibration position.

When the first reading surface 12 is to be cleaned, the first rotating drum 31 rotates and passes through the cleaning position so that the first reading surface 12 is cleaned by the cleaning brush 32.

In the exemplary embodiment, the substances adhering to the cleaning brush 32 are removed when the cleaning brush 32 comes into contact with the removing rib 38, which is disposed upstream of the first reading surface 12 in the transporting direction of the recording sheet S and in the rotation direction Y1 of the first rotating drum 31.

According to the related art described in Patent Document 1, the brush portion (32) comes into contact with the plate-shaped member (6) so that substances adhering to the brush portion (32) are removed, and the plate-shaped member (6) is disposed downstream of the platen glass (G1) in the rotation direction of the brush portion (32). In this structure, the removed substances fall downward from the plate-shaped member (6). In other words, the substances fall onto the platen glass (G1), which is an object to be cleaned, after the platen glass (G1) is cleaned. A document that is read passes through a position very close to the space below the plate-shaped member (6), and there is a possibility that the substances will be moved by an airflow generated by the passage of the document and cause an adverse effect on the process of reading the document or adhere to and soil the document.

In contrast, according to the exemplary embodiment, the removing rib 38 is disposed upstream of the first reading surface 12 in the rotation direction of the first rotating drum 31. Therefore, the substances removed by the removing rib 38 are retained on the upper surface of the removing rib 38.

In the exemplary embodiment, the substances are removed and received by the upper surface of the removing rib 38 when the cleaning brush 32 passes through the position of the removing rib 38 in a direction from the outside to the inside of the transport path (transport space) SH, more specifically, in a downward direction. Therefore, even when some of the substances fall onto the first reading surface 12 from the removing rib 38, the fallen substances may be quickly removed by the cleaning brush 32 after the cleaning brush 32 passes the removing rib 38.

In the exemplary embodiment, the removing rib 38 includes the reservoir portion 38*b* having a recessed shape.

In the exemplary embodiment, the cleaning brush 32 is not provided over the entire circumference of the first rotating drum 31.

In the exemplary embodiment, two types of guides 34 and 37 corresponding to different thicknesses of the recording sheet S are prepared. When only one type of guide is prepared, the distance between the recording sheet S and the first image sensor 14 varies if the interval between the guide and the first reading surface 12 is excessively large relative to the thickness of the recording sheet S, and there is a possibility that a reduction in the reading accuracy or a reading failure will occur. In contrast, in the exemplary embodiment, one of the guides 34 and 37 is selected in accordance with the thickness of the recording sheet S.

In the exemplary embodiment, two types of calibration plates 33 and 36 are prepared.

In the downstream calibration unit 4, the rotating drum 41 is disposed below the second reading surface 22 in the direction of gravity. Therefore, the substances are less likely to adhere to the second reading surface 22, which is disposed in an upper region in the direction of gravity, than to the first reading surface 12. However, in the exemplary embodiment, the substances adhering to the cleaning brush 42 are removed by the removing rib 48 disposed upstream of the second reading surface 22 in the rotation direction of the rotating drum 41. The substances removed by the removing rib 48 fall downward away from the second reading surface 22 due to gravity.

Modifications

Although an exemplary embodiment of the present disclosure have been described in detail, the present disclosure is not limited to the above-described exemplary embodiment, and various modifications are possible within the gist of the present disclosure described in the claims. Modifications (H01) to (H010) of the present disclosure will now be described.

(H01) Although the printer U is described as an example of an image forming apparatus in the above-described exemplary embodiment, the image forming apparatus is not limited to this, and may be, for example, a copy machine, a facsimile machine, or a multifunction machine having some or all of the functions of these machines. Also, the image forming apparatus is not limited to an electrophotographic image forming apparatus, and may be any image forming apparatus, such as an inkjet or thermal transfer image forming apparatus.

(H02) Although the printer U uses developers of five colors in the above-described exemplary embodiment, the image forming apparatus is not limited to this, and may be, for example, a monochrome image forming apparatus or a multicolor image forming apparatus that uses four or less or six or more colors.

(H03) Although the endless band-shaped intermediate transfer belt B is described as an example of an image carrier in the above-described exemplary embodiment, the image carrier is not limited to this. The image carrier may be, for example, a cylindrical intermediate transfer drum, a photoconductor drum, or a photoconductor belt. Also, the intermediate transfer body may be omitted, and an image may be recorded on a recording sheet S directly from a photoconductor.

(H04) Although the cleaning brush 32 is described as an example of a cleaning unit in the above-described exemplary embodiment, the cleaning unit is not limited to this. For example, a cleaning blade composed of a rubber plate or the like or a cleaning unit composed of cloth or the like may also be used.

(H05) Although the reservoir portion **38*b* may be provided in the above-described exemplary embodiment, the reservoir portion 38*b*** may be omitted.

(H06) Although one cleaning brush 32 is provided in the rotation direction of the first rotating drum 31 in the above-described exemplary embodiment, the structure is not limited to this. The structure may be such that two or more cleaning brushes are provided.

(H07) Although two types of guides 34 and 37 and two types of calibration plates 33 and 36 are provided in the above-described exemplary embodiment, the structure is not limited to this. The number of types of the guides and the calibration plates may be one, or three or more. In addition, although at least one guide, which is a member for guiding the recording sheet S, may be provided, the guide may be omitted or be provided as a component separate from the first rotating drum 31.

(H08) Although two sensor units, which are the upstream sensor unit 1 and the downstream sensor unit 2, are provided in the above-described exemplary embodiment, the structure is not limited to this. The structure may be such that only one sensor unit is provided.

(H09) Although the test device IS that reads the recording sheet S that has passed through the fixing device F is described as an image reading device in the above-described exemplary embodiment, the image reading device is not limited to this. The image reading device may be, for example, a scanner device or a facsimile device that reads an image on a document. The image reading device may be any device including a unit through which a paper sheet, which is a medium, passes and that needs to be cleaned.

(H010) Although the first reading surface 12 is described as an example of a cleaning section in the above-described exemplary embodiment, the cleaning section is not limited to this. The cleaning section may be, for example, a reading element or an optical component of a scanner device or a roller, a belt, or the like to which developer, paper dust, discharge products, or the like adhere.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A cleaning device including:

a cleaning unit that cleans a cleaning section by coming into contact with the cleaning section, the cleaning section being disposed in a transport space through which a medium is transported;

a support unit that supports the cleaning unit, the support unit rotating about a rotation center to cause the cleaning unit to pass the cleaning section in a direction along a transporting direction in which the medium is transported; and a removing unit that is disposed upstream of the cleaning section in the transporting direction of the medium and that comes into contact with the cleaning unit to remove a substance adhering to the cleaning unit.

(((2)))

The cleaning device according to (((1))), wherein the removing unit is disposed in a region through which the cleaning unit passes from an outside to an inside of the transport space.

(((3)))

The cleaning device according to (((1))) or (((2))), further comprising:

a reservoir unit disposed on an upper surface of the removing unit, the reservoir unit having a recessed shape and being capable of storing the substance.

(((4)))

The cleaning device according to any one of (((1))) to (((3))), wherein the cleaning unit is disposed on a portion of an outer peripheral surface of the support unit in a rotation direction in which the support unit rotates.

(((5)))

The cleaning device according to any one of (((1))) to (((4))), further comprising:

a guide unit that is supported on the outer peripheral surface of the support unit and that guides the medium in a state such that the guide unit faces the cleaning section.

(((6)))

The cleaning device according to (((5))), wherein the support unit causes the guide unit to continuously face the cleaning section when the medium is transported, and rotates to cause the cleaning unit to pass the cleaning section and clean the cleaning section in a predetermined cleaning period.

(((7)))

A reading device including:

a reading unit including a reading portion disposed in a transport space through which a medium is transported, the reading unit reading an image on the medium;

a cleaning unit that cleans the reading portion by coming into contact with the reading portion;

a support unit that supports the cleaning unit, the support unit rotating about a rotation center to cause the cleaning unit to pass the reading portion in a direction along a transporting direction in which the medium is transported; and a removing unit that is disposed upstream of the reading portion in the transporting direction of the medium and that comes into contact with the cleaning unit, which moves as the support unit rotates, to remove a substance adhering to the cleaning unit.

(((8)))

The reading device according to (((7))), further comprising:

a calibrating unit that is supported on an outer peripheral surface of the support unit and that calibrates the reading unit in a state such that the calibrating unit faces the reading portion.

(((9)))

The reading device according to (((8))), wherein the calibrating unit includes:

a first calibrating unit having a predetermined color; and a second calibrating unit having a color that differs from the color of the first calibrating unit.

(((10)))

An image forming apparatus including:

a recording unit that records an image on a medium; and the reading device according to any one of (((7))) to (((9))) that reads the image recorded on the medium by the recording unit.

What is claimed is:

1. A cleaning device comprising:

a cleaning unit comprising a brush that cleans a cleaning section by coming into contact with the cleaning section, the cleaning section being disposed in a transport space through which a medium is transported;

a support unit comprising a drum that supports the cleaning unit, the support unit rotating about a rotation center to cause the cleaning unit to pass the cleaning section in a direction along a transporting direction in which the medium is transported; and a removing unit comprising a rib that is disposed upstream of the cleaning section with respect to the transporting direction of the medium, wherein an end portion of the removing unit is bent upward toward the cleaning unit to form a reservoir unit disposed on an upper surface of the end portion, and the upper surface of the end portion of the removing unit comes into contact with the cleaning unit to remove a substance adhering to the cleaning unit.

2. The cleaning device according to claim 1, wherein the removing unit is disposed in a region through which the cleaning unit passes from an outside to an inside of the transport space.

3. The cleaning device according to claim 2, wherein the reservoir unit is formed to have a recessed shape and being capable of storing the substance.

4. The cleaning device according to claim 1, wherein the cleaning unit is disposed on a portion of an outer peripheral surface of the support unit in a rotation direction in which the support unit rotates.

5. The cleaning device according to claim 4, further comprising:

a guide unit comprising a guide that is supported on the outer peripheral surface of the support unit and that guides the medium in a state such that the guide unit faces the cleaning section.

6. The cleaning device according to claim 5, wherein the support unit causes the guide unit to continuously face the cleaning section when the medium is transported, and rotates to cause the cleaning unit to pass the cleaning section and clean the cleaning section in a predetermined cleaning period.

7. A reading device comprising:

a reading unit comprising an image sensor including a reading portion disposed in a transport space through which a medium is transported, the reading unit reading an image on the medium;

a cleaning unit comprising a brush that cleans the reading portion by coming into contact with the reading portion;

a support unit comprising a drum that supports the cleaning unit, the support unit rotating about a rotation center to cause the cleaning unit to pass the reading portion in a direction along a transporting direction in which the medium is transported; and a removing unit comprising a rib that is disposed upstream of the reading portion with respect to the transporting direction of the medium, wherein an end portion of the removing unit is bent upward toward the cleaning unit to form a reservoir unit disposed on an upper surface of the end portion, and the upper surface of the end portion of the removing unit comes into contact with the cleaning unit, which moves as the support unit rotates, to remove a substance adhering to the cleaning unit.

8. The reading device according to claim 7, further comprising:

a calibrating unit comprising a calibration plate that is supported on an outer peripheral surface of the support unit and that calibrates the reading unit in a state such that the calibrating unit faces the reading portion.

9. The reading device according to claim 8, wherein the calibrating unit includes:

a first calibrating unit comprising a first calibration plate having a predetermined color; and a second calibrating unit comprising a second calibration plate having a color that differs from the color of the first calibrating unit.

10. An image forming apparatus comprising:

a recording unit including a plurality of photoconductors that records an image on a medium; and the reading device according to claim 9 that reads the image recorded on the medium by the recording unit.

11. An image forming apparatus comprising:

a recording unit including a plurality of photoconductors that records an image on a medium; and the reading device according to claim 8 that reads the image recorded on the medium by the recording unit.

12. An image forming apparatus comprising:

a recording unit including a plurality of photoconductors that records an image on a medium; and the reading device according to claim 7 that reads the image recorded on the medium by the recording unit.

13. A cleaning device comprising:

cleaning means comprising a brush for cleaning a cleaning section by coming into contact with the cleaning section, the cleaning section being disposed in a transport space through which a medium is transported;

support means comprising a drum for supporting the cleaning means, the support means rotating about a rotation center to cause the cleaning means to pass the cleaning section in a direction along a transporting direction in which the medium is transported; and removing means comprising a rib that is disposed upstream of the cleaning section with respect to the transporting direction of the medium, wherein an end portion of the removing means is bent upward toward the cleaning means to form a reservoir means disposed on an upper surface of the end portion, and the upper surface of the end portion of the removing means comes into contact with the cleaning means to remove a substance adhering to the cleaning means.

* * * * *